United States Patent
Park et al.

(10) Patent No.: US 10,802,206 B2
(45) Date of Patent: Oct. 13, 2020

(54) CURVED DISPLAY DEVICE

(71) Applicant: Samsung Display Co., Ltd., Yongin-si (KR)

(72) Inventors: Dongjin Park, Hwaseong-si (KR); Byoungjin Jin, Yongin-si (KR); Jonghyeon Choi, Pyeongtaek-si (KR)

(73) Assignee: Samsung Display Co., Ltd., Yongin-si ( * ) Notice: Subject to any disclaimer, the term of this patent is extended or adjusted under 35 U.S.C. 154(b) by 0 days.

(21) Appl. No.: 16/788,129

(22) Filed: Feb. 11, 2020

(65) Prior Publication Data

US 2020/0257037 A1 Aug. 13, 2020

(30) Foreign Application Priority Data

Feb. 13, 2019 (KR) .................. 10-2019-0016419

(51) Int. Cl.
  *H05K 5/02* (2006.01)
  *F21V 8/00* (2006.01)
  *H05K 5/00* (2006.01)
  *G09F 13/04* (2006.01)

(52) U.S. Cl.
  CPC ......... *G02B 6/0088* (2013.01); *G02B 6/0045* (2013.01); *H05K 5/0017* (2013.01); *G09F 2013/0481* (2013.01)

(58) Field of Classification Search
  CPC .................. G09F 2013/0481; H05K 5/0017
  USPC ........................................................ 362/611
  See application file for complete search history.

(56) References Cited

U.S. PATENT DOCUMENTS

| | | | |
|---|---|---|---|
| 9,417,661 B2 | 8/2016 | McClure et al. | |
| 9,804,430 B2 | 10/2017 | Won et al. | |
| 10,033,844 B2 | 7/2018 | Lee et al. | |
| 10,101,527 B2 | 10/2018 | Huang et al. | |
| 10,289,167 B2 | 5/2019 | McClure et al. | |
| 2006/0273304 A1* | 12/2006 | Cok ....................... | H01L 51/524 257/40 |
| 2007/0146569 A1* | 6/2007 | Nouchi ............. | G02F 1/133602 349/58 |
| 2016/0066410 A1* | 3/2016 | Cho ........................ | H05K 1/111 361/749 |
| 2016/0205391 A1* | 7/2016 | Kim ..................... | G09G 3/3225 348/51 |
| 2017/0374750 A1* | 12/2017 | Sun ..................... | H01L 51/5237 |
| 2018/0157092 A1 | 6/2018 | Jung et al. | |
| 2020/0111441 A1* | 4/2020 | Liu ......................... | G09G 5/003 |

FOREIGN PATENT DOCUMENTS

| | | |
|---|---|---|
| KR | 10-1396054 | 10/2012 |
| KR | 10-2016-0003499 | 1/2016 |
| KR | 10-2017-0082043 | 7/2017 |
| KR | 10-2018-0065064 | 6/2018 |

* cited by examiner

*Primary Examiner* — Christopher M Raabe
(74) *Attorney, Agent, or Firm* — H.C. Park & Associates

(57) ABSTRACT

A curved display device including: a support frame having a curved shape; and a display panel disposed on the support frame and having a curved shape. The support frame is curved into a shape of an arc of a sector, and a first side surface of the support frame is parallel to a first radius of the sector.

10 Claims, 6 Drawing Sheets

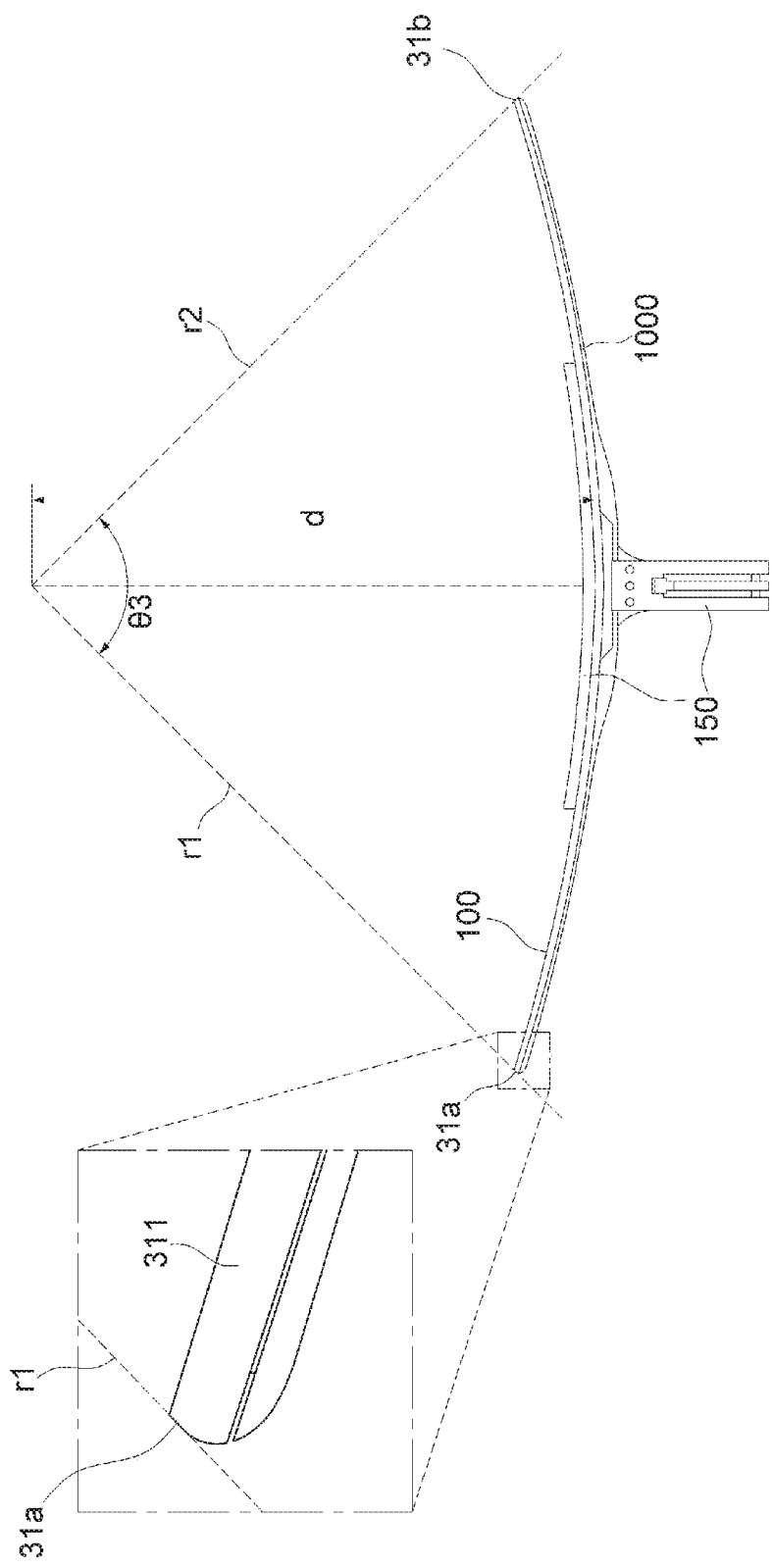

CURVED DISPLAY DEVICE

CROSS-REFERENCE TO RELATED APPLICATION

This application claims priority from and the benefit of Korean Patent Application No. 10-2019-0016419, filed on Feb. 13, 2019, which is hereby incorporated by reference for all purposes as if fully set forth herein.

BACKGROUND

Field

Exemplary embodiments of the invention relate generally to a display device, and more specifically, to a curved display device capable of reducing a size of a bezel visually recognized from a user.

Discussion of the Background

Liquid crystal display (LCD) devices are one of the most widely used types of flat panel display (FPD) devices. Such an LCD device includes two substrates on which field generating electrodes are formed and a liquid crystal layer interposed therebetween. An LCD device is a display device that adjusts the amount of transmitted light by applying voltage to the field generating electrodes and rearranging liquid crystal molecules of the liquid crystal layer.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

The above information disclosed in this Background section is only for understanding of the background of the inventive concepts, and, therefore, it may contain information that does not constitute prior art.

SUMMARY

Exemplary embodiments of the present invention are directed to a curved display device capable of reducing a size of a bezel visually recognized from a user.

Additional features of the inventive concepts will be set forth in the description which follows, and in part will be apparent from the description, or may be learned by practice of the inventive concepts.

According to an exemplary embodiment, a curved display device includes: a support frame having a curved shape; and a display panel disposed on the support frame and having a curved shape. The support frame is curved into a shape of an arc of a sector, and a first side surface of the support frame is parallel to a first radius of the sector.

A second side surface of the support frame that faces the first side surface may be parallel to a second radius of the sector.

An angle between an extension line of the first side surface and an extension line of the second side surface may be substantially equal to an angle of the sector.

An angle between the first side surface and a display surface of the display panel may be an obtuse angle.

An angle between the first side surface and the display surface of the display panel may be in a range from about 121.85 degrees to about 127.85 degrees.

A distance between the first side surface and a side surface of the display panel adjacent to the first side surface may be about 1.6 mm.

An angle between the second side surface and a display surface of the display panel may be an obtuse angle.

An angle between the second side surface and the display surface of the display panel may be in a range from about 121.85 degrees to about 127.85 degrees.

A distance between the second side surface and a side surface of the display panel adjacent to the second side surface may be about 1.6 mm.

The curved display device may further include: a light guide plate disposed below the display panel; and a light source disposed on at least one side of the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a view for explaining an angle between a first side surface and a second side surface of a support frame.

DETAILED DESCRIPTION

Figure 1:
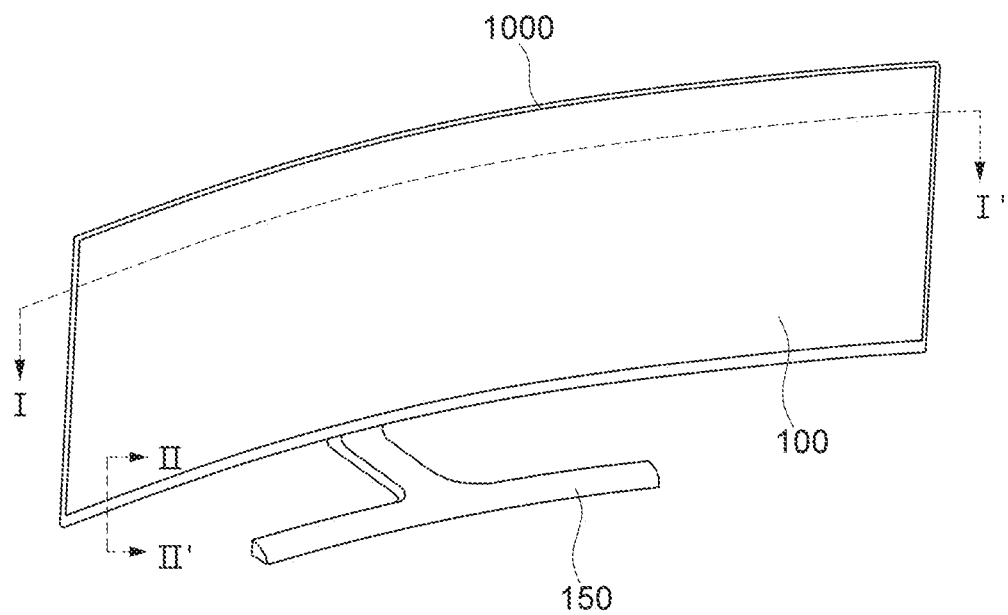
FIG. 1 is a perspective view illustrating a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
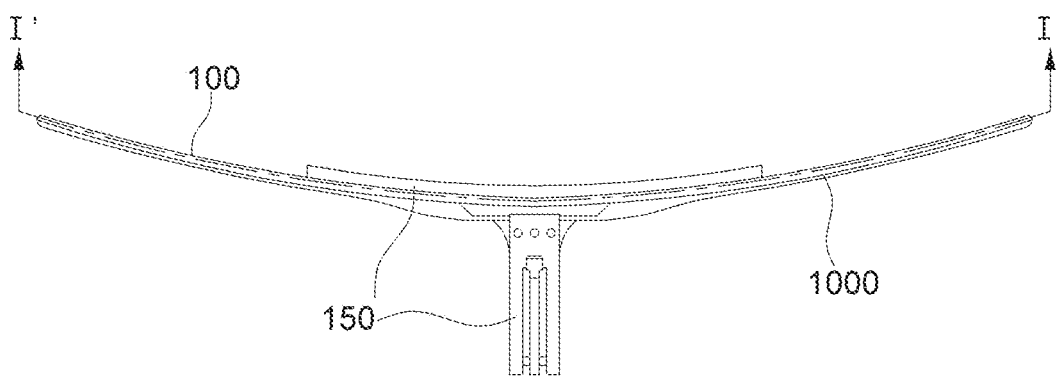
FIG. 2 is a view illustrating the curved display device of FIG. 1 viewed from above.
Figure 3:
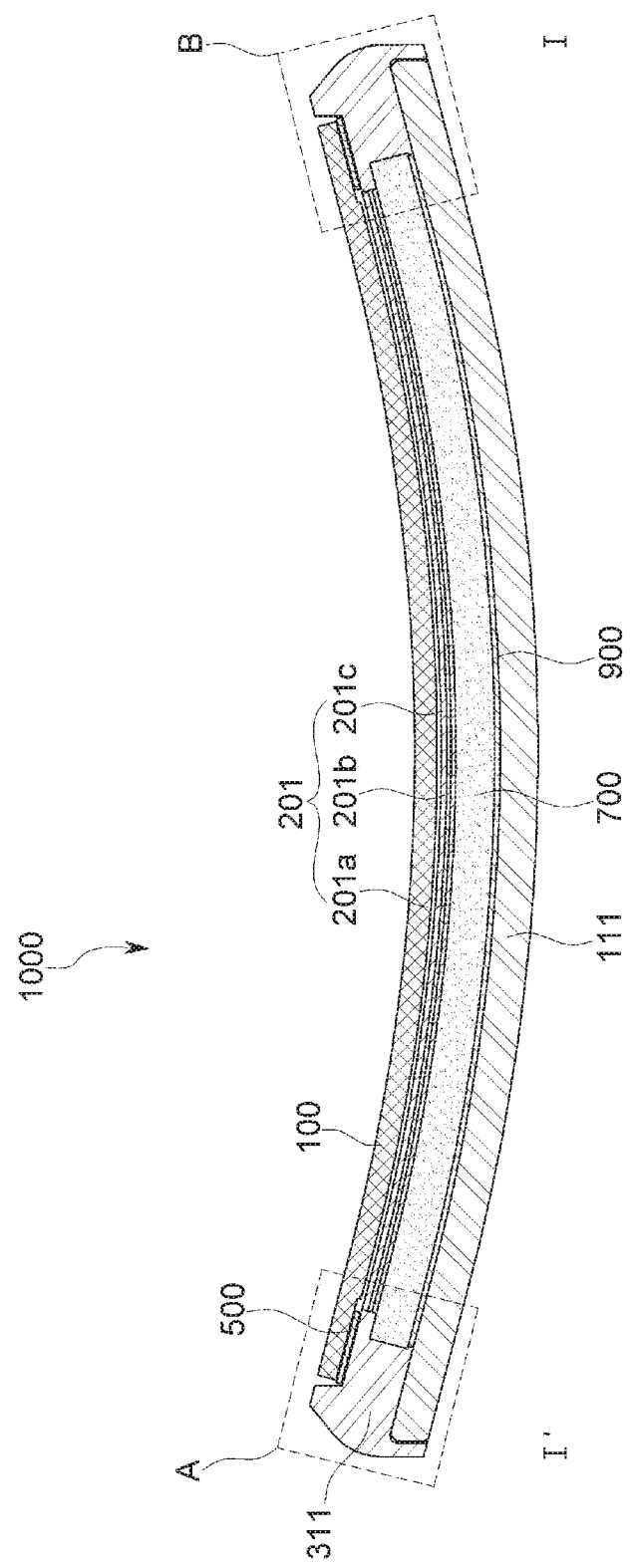
FIG. 3 is a cross-sectional view taken along line I-I' in FIGS. 1 and 2.
Figure 4:
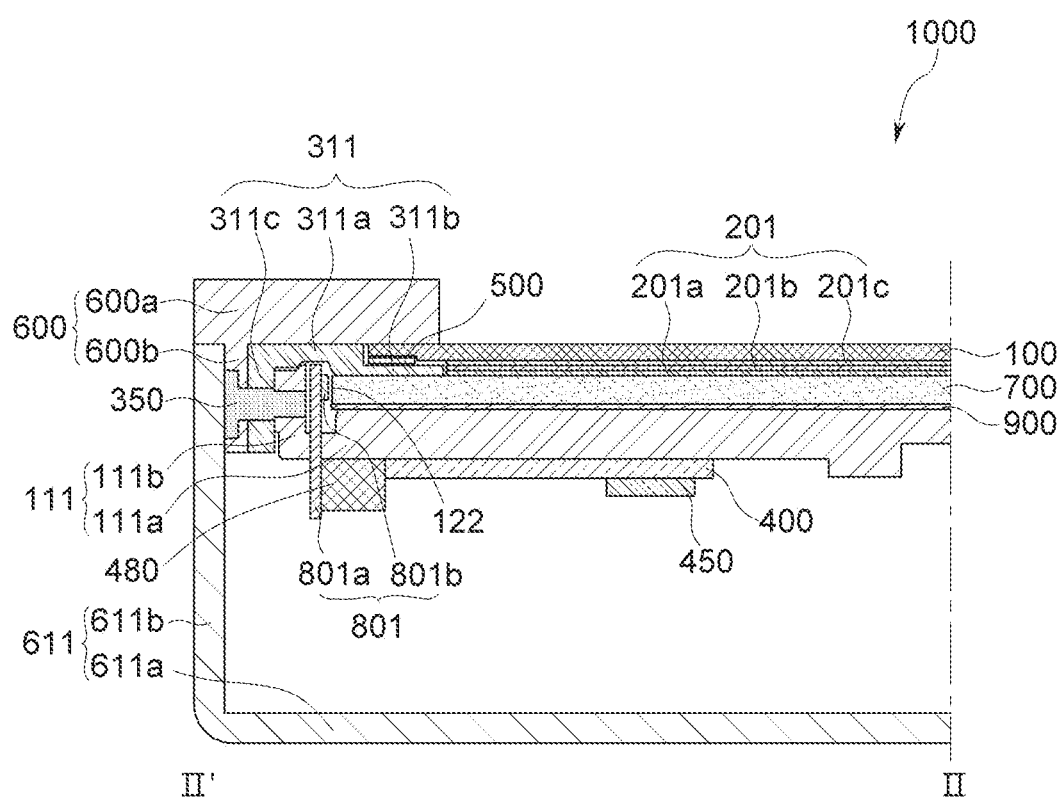
FIG. 4 is a cross-sectional view taken along line II-II' in FIG. 1.

FIG. 1 is a perspective view illustrating a display device according to an exemplary embodiment, FIG. 2 is a view illustrating the curved display device of FIG. 1 viewed from above, FIG. 3 is a cross-sectional view taken along line I-I' in FIGS. 1 and 2, and FIG. 4 is a cross-sectional view taken along line II-II' in FIG. 1.

A curved display device 1000 according to an exemplary embodiment is a curved display device 1000 that is roundly curved with respect to a central portion of a display panel 100, as illustrated in FIGS. 1 and 2. In other words, a display device according to the present invention is the curved display device 1000 in which opposite sides are roundly curved with respect to a central portion of a display area of the display panel 100. Hereinbelow, unless stated otherwise, all components of the display device 1000 include a material capable of being curved. In an exemplary embodiment, the display device 1000 may be supported by a support 150.

The curved display device 1000 according to an exemplary embodiment includes a bottom cover 111, a reflection plate 900, a light guide plate 700, an optical sheet 201, a light source unit 801, a support frame 311, an adhesive 500, a display panel 100, a top cover 600, and a protective cover 611, as illustrated in FIGS. 3 and 4. Each of the components listed above has a roundly curved shape corresponding to a curved shape of the curved display device 1000. As used herein, the reflection plate 900, the light guide plate 700, the optical sheet 201, the light source unit 801, and the support frame 311 are included in a backlight unit. In an exemplary embodiment, the display panel 100 and the backlight unit are assembled in a laminated state to form a display module. The display module may further include a top cover 600 and a bottom cover 111 for protecting and securing the display panel 100 and the backlight unit, and a driving circuit board (not illustrated) for driving the display panel 100.

The bottom cover 111 has an accommodation space therein. The reflection plate 900, the light guide plate 700, the optical sheet 201, and the light source unit 801 may be disposed in this accommodation space. In order to secure this accommodation space, the bottom cover 111 may include a base portion 111a and a plurality of side portions 111b. For example, the base portion 111a may have a quadrangular shape, and each of the side portions 111b described above protrudes to a predetermined height from each edge of the base portion 111a. Edges of the side portions 111b adjacent to each other may be connected to each other. A space defined by being surrounded by the side portions 111b and the base portion 111a may be the accommodation space described above.

The light source unit 801 generates light. The light source unit 801 may include a light source printed circuit board 801a and at least one light source 801b, as illustrated in FIG. 4. In such an exemplary embodiment, the light source printed circuit board 801a has a roundly curved shape.

One surface of the light source printed circuit board 801a may be divided, although not illustrated, into at least one mounting area and a wiring area. In a case where two or more light sources 801b are provided, the light sources 801b are disposed at the mounting areas, respectively, and a plurality of wirings for transmitting a driving power to the light sources 801b are disposed at the wiring area. The aforementioned driving power is generated at an external power supply (not illustrated), and then applied to the plurality of wirings through a connector 480. One edge of the light source printed circuit board 801a may pass through the base portion 111a of the bottom cover 111 and be exposed to the outside of the bottom cover 111. The aforementioned connector 480 may be disposed at one edge of the light source printed circuit board 801a that is exposed to the outside of the bottom cover 111.

The light source 801b emits light. The light source 801b is disposed at the light source printed circuit board 801a. The light source 801b may be a light emission package including at least one light emitting diode (LED). For example, one light emission package may include therein a red LED for emitting red light, a green LED for emitting green light, and a blue LED for emitting blue light. The light emission package combines three kinds of hues to produce white light. In another exemplary embodiment, the light emission package may only include the blue LED of the LEDs of the colors described above. In such an exemplary embodiment, a fluorescent material, e.g., a phosphor, for converting a blue light into a white light may be disposed at a light emission portion of the blue LED. A light emitted from the light source 801b is incident to the light guide plate 700.

As illustrated in FIGS. 3 and 4, the light guide plate 700 may have a roundly curved polyhedron shape. One of a plurality of surfaces included in the light guide plate 700 that faces the light source may be defined as a light incidence surface 122. The light incidence surface 122 may have a roundly curved shape. A light emitted from the light source 801b is incident to the light incidence surface 122, and then proceeds toward the inside of the light guide plate 700. The light guide plate 700 totally reflects the light that has entered the light guide plate 700 and guides the light toward the display area of the display panel 100. In an exemplary embodiment, although not illustrated, in order to improve reflectance of the light guide plate 700, a plurality of scattering patterns may be further provided at a lower outer surface of the light guide plate 700. In such an exemplary embodiment, the scattering patterns may be arranged so that their intervals gradually increase as they are located farther away from the light incidence surface 122 of the light guide plate 700.

The light guide plate 700 may include a material having a light transmitting property to guide light efficiently, e.g., an acrylic resin, such as polymethyl methacrylate (PMMA), and polycarbonate (PC).

The reflection plate 900 may be disposed below the light guide plate 700. For example, the reflection plate 900 may be disposed between the base portion 111a of the bottom cover 111 and the light guide plate 700. The reflection plate 900 reflects a light that has passed through a lower outer surface of the light guide plate 700 to be emitted to the outside, so that it may return toward the light guide plate 700, and the light loss rate may be substantially minimized.

The optical sheet 201 serves to diffuse and collimate the light guided from the light guide plate 700. The optical sheet 201 may be disposed between the light guide plate 700 and the display panel 100, as illustrated in FIGS. 3 and 4. The optical sheet 201 may include a diffusion sheet 201a, a light collimation sheet 201b, and a protection sheet 201c. The diffusion sheet 201a, the light collimation sheet 201b and the protection sheet 201c may be sequentially stacked on the light guide plate 700 in the order listed. In another exemplary embodiment, the optical sheet may include a diffusion sheet 201a and a double brightness enhancement film on the diffusion sheet 201a.

The diffusion sheet 201a serves to diffuse the light guided from the light guide plate 700 so as to substantially prevent the light from being partially concentrated.

The light collimation sheet 201b is disposed on the diffusion sheet 201a. The light collimation sheet 201b serves to collimate the light diffused by the diffusion sheet 201a in a direction perpendicular to the display panel 100. To this end, triangular prisms may be arranged on a surface of the light collimation sheet 201b into a predetermined arrangement.

The protection sheet 201c is disposed on the light collimation sheet 201b. The protection sheet 201c serves to protect a surface of the light collimation sheet 201b, and diffuse the light to achieve uniform light distribution. A light having passed through the protection sheet 201c is provided to the display panel 100.

The support frame 311, in a state of being secured to the bottom cover 111, supports the display panel 100 and the top cover 600, and also maintains a uniform distance between the display panel 100 and the optical sheet 201. To this end, the support frame 311 may have a quadrangular frame shape including a first support portion 311a, a second support portion 311b, and a side portion 311c.

The first support portion 311a is disposed on the plurality of side portions 311c to support the top cover 600 that covers the first support portion 311a from the above.

The second support portion 311b extends from an inner edge of the first support portion 311a toward the optical sheet 201. A height in the thickness direction of the second support portion 311b is lower than a height of the first support portion 311a. A space is provided between the top cover 600 and the second support portion 311b by the difference in height between the second support portion 311b and the first support portion 311a, and an edge of the display panel 100 is disposed at the space.

The side portion 311c extends from a lower side surface of the first support portion 311a toward the protective cover 611. For example, the side portion 311c extends toward the base portion 611a of the protective cover 611.

The adhesive 500 is disposed between the second support portion 311b of the support frame 311 and an edge of the display panel 100. The adhesive 500 bonds the support frame 311 and the display panel 100 to each other.

The top cover 600 is disposed on an edge of the display panel 100, the support frame 311, and the side portion 611b of the protective cover 611. The top cover 600 may include a cover portion 600a and a side portion 600b.

The cover portion 600a is disposed on the edge of the display panel 100, the support frame 311, and the side portion 611b of the protective cover 611.

The side portion 600b extends from a lower surface of the cover portion 600a toward the base portion 611a of the protective cover 611. The side portion 600b of the top cover 600 is disposed between the side portion 611b of the protective cover 611 and the side portion 311c of the support frame 311.

The display panel 100 receives an image data signal from a system (not illustrated) and receives a light from the backlight unit, thus displaying images. Although not illustrated, the display panel 100 may include a plurality of pixels, a plurality of switching elements, a plurality of gate lines and a plurality of data lines connected to the pixels through the plurality of switching elements. The display panel 100 may have a quadrangular shape (e.g., a rectangular shape), as illustrated in FIG. 1. In such an exemplary embodiment, two relatively long sides (hereinafter, "long sides") may have a roundly curved shape, while two relatively short sides (hereinafter, "short sides") may have a straight line shape. In another exemplary embodiment, on the contrary, the long sides may have a straight line shape, and the short sides may have a roundly curved shape.

The drive printed circuit board 400 is disposed on a back surface of the bottom cover 111. The drive printed circuit board 400 may be electrically connected to one edge of the display panel 100. In such an exemplary embodiment, the drive printed circuit board 400 may be connected to one edge of the display panel 100 through a data driver. The data driver may supply the aforementioned image data signal to the data lines of the display panel 100 through signal lines of the drive printed circuit board 400.

A panel driver 450 may be disposed on the drive printed circuit board 400. The panel driver 450 may generate various signals required to drive the display panel 100.

The protective cover 611 is disposed on the top cover 600, the support frame 311, the bottom cover 111, the drive printed circuit board 400 and the panel driver 450. The protective cover 611 may include the base portion 611a and the side portion 611b.

The base portion 611a is disposed on the top cover 600, the support frame 311, the bottom cover 111, the drive printed circuit board 400, and the panel driver 450.

The side portion 611b extends from one edge of the base portion 611a toward the cover portion 600a of the top cover 600.

A fastening portion 350 is inserted into a fastening hole defined through the side portion 600b of the top cover 600, the side portion 311c of the support frame 311, and the side portion 111b of the bottom cover 111. The top cover 600 and the support frame 311 may be secured to the bottom cover 111 by the fastening portion 350.

Figure 5:
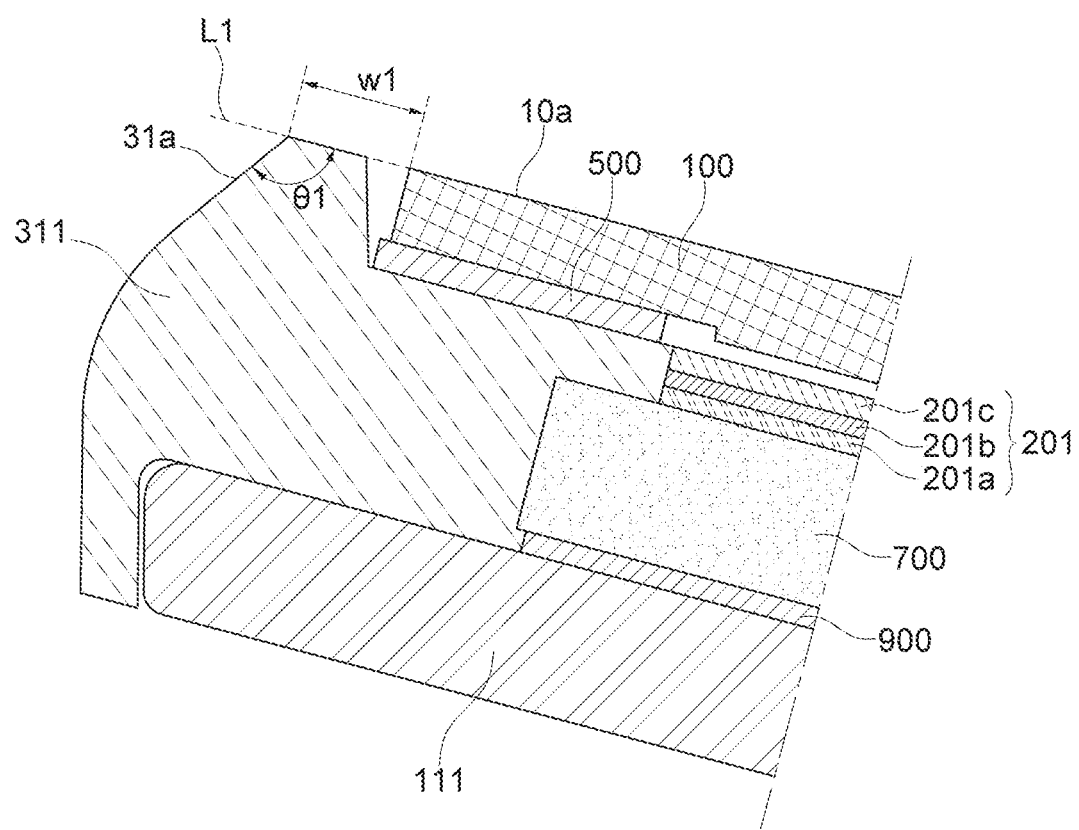
FIG. 5 is a view enlarging area A of FIG. 3.
Figure 6:
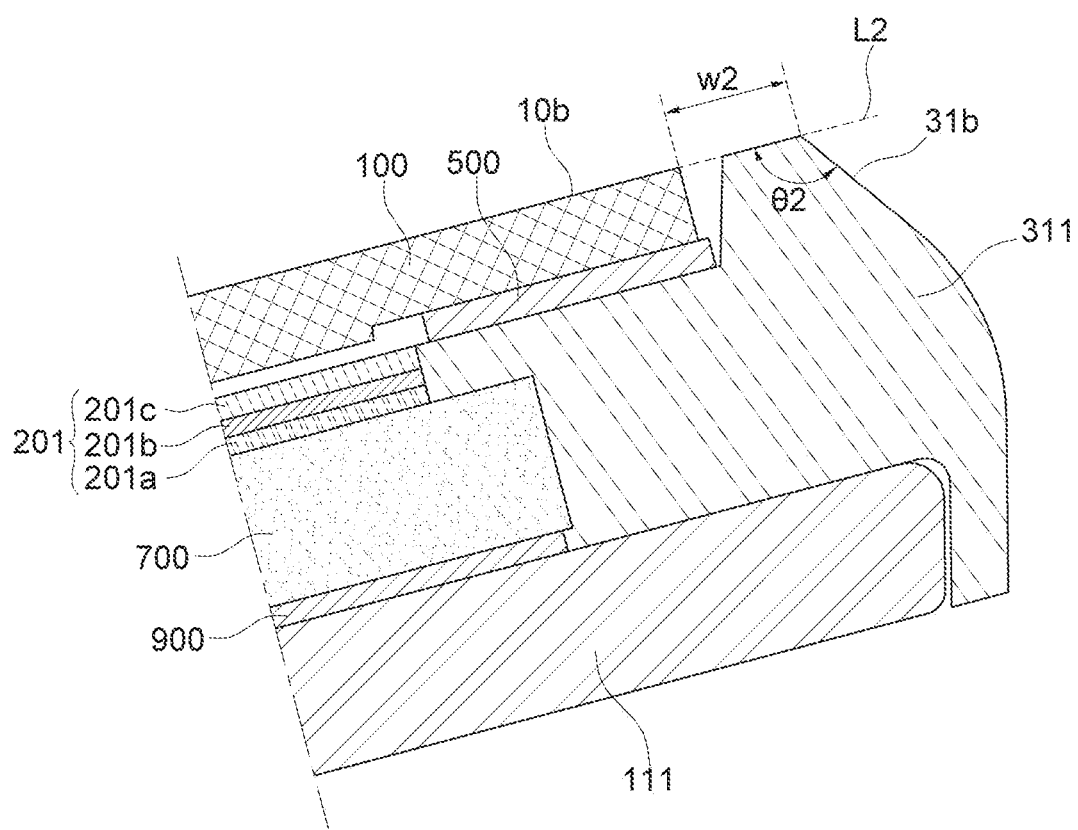
FIG. 6 is a view enlarging area B of FIG. 3.

FIG. 5 is a view enlarging area A of FIG. 3, and FIG. 6 is a view enlarging area B of FIG. 3.

An angle $\theta 1$ between a first side surface 31a of the support frame 311 and a front side of the display panel 100 may be greater than 90 degrees, as illustrated in FIG. 5. For example, an angle $\theta 1$ formed by the first side surface 31a of the support frame 311 and a display surface 10a disposed at the front side of the display panel 100 may be greater than 90 degrees. As a more specific example, an angle $\theta 1$ between the first side surface 31a of the support frame 311 and an imaginary line L1 extending from an edge surface of the display surface 10a neighboring the first side surface 31a may be greater than 90 degrees. In such an exemplary embodiment, the first side surface 31a of the support frame 311 refers to a non-curved surface among the edge surfaces of the support frame 311.

As an example, in a case where a size of the display panel 100 is 49 inches, the aforementioned angle $\theta 1$ may be in a range from about 121.85 degrees to about 127.85 degrees. For example, in a case where the size of the display panel 100 is 49 inches, the aforementioned angle $\theta 1$ may be about 124.85 degrees. As another example, in a case where the size of the display panel 100 is 43.4 inches, the aforementioned angle $\theta 1$ may be in a range from about 119.3 degrees to about 125.3 degrees. For example, in a case where the size of the display panel 100 is 43.4 inches, the aforementioned angle $\theta 1$ may be about 122.3 degrees. In such an exemplary embodiment, the display panel 100 may have a screen aspect ratio of about 32:9.

An angle $\theta 2$ between a second side surface 31b of the support frame 311 and the front side of the display panel 100 may be greater than 90 degrees, as illustrated in FIG. 6. For example, an angle $\theta 2$ formed by the second side surface 31b of the support frame 311 and the display surface 10a disposed at the front side of the display panel 100 may be greater than 90 degrees. As a more specific example, an angle $\theta 2$ between the second side surface 31b of the support frame 311 and an imaginary line L2 extending from an edge surface of the display surface 10a neighboring the second side surface 31b may be greater than 90 degrees. In such an exemplary embodiment, the second side surface 31b of the support frame 311 refers to a non-curved surface among the edge surfaces of the support frame 311. The second side surface 31b faces the first side surface 31a.

As an example, in a case where a size of the display panel 100 is 49 inches, the aforementioned angle $\theta 2$ may be in a range from about 121.85 degrees to about 127.85 degrees. For example, in a case where the size of the display panel 100 is 49 inches, the aforementioned angle $\theta 2$ may be about 124.85 degrees. As another example, in a case where the size of the display panel 100 is 43.4 inches, the aforementioned angle $\theta 2$ may be in a range from about 119.3 degrees to about 125.3 degrees. In such an exemplary embodiment, the display panel 100 may have a screen aspect ratio of about 32:9.

FIG. 7 is a view for explaining an angle between the first side surface 31a and the second side surface 31b of the support frame 311.

As illustrated in FIG. 7, the support frame 311 which is curved and included in the curved display device 1000 corresponds to an arc of a sector, and the first side surface 31a of the support frame 311 is parallel to a first radius r1 of the sector, and the second side surface 31b of the support frame 311 is parallel to a second radius r2 of the sector. In other words, the first side surface 31a of the support frame 311 coincides with the first radius r1 of the sector, and the second side surface 31b of the support frame 311 coincides with the second radius r2 of the sector. Accordingly, an angle formed between an extension line of the first side surface 31a and an extension line of the second side surface 31b is substantially the same as an angle θ3 of the sector.

In an exemplary embodiment, a center point of the sector may correspond to a position of a user, and the angle θ3 of the sector may correspond to a range of line of sight of the user viewing the display device 1000. In such an exemplary embodiment, a distance between the user and the display device 1000 may be about 60 cm. In such an exemplary embodiment, since the user's line of sight is invariably coincident with the first side surface 31a and the second side surface 31b of the support frame 311, a size w of a bezel of the display device 1000 may be substantially minimized, while maintaining a strength of the display device 1000. That is, a distance between the first side surface 31a and the second side surface 31b increases from a front surface portion of the support frame 311 toward a back surface portion of the support frame 311, thus increasing a strength of the support frame 311. In such a case, when the distance between the first side surface 31a and the second side surface 31b is too wide, the size w of the bezel may increase. Accordingly, by adjusting the aforementioned angle so that the line of sight of the user coincides with the first side surface 31a and the second side surface 31b of the support frame 311, the size w of the bezel may be substantially minimized, while suitably maintaining the strength of the support frame 311. As used herein, the size w of the bezel may be defined as a width w between a side surface of the display panel 100 and a side surface of the support frame 311 neighboring the side surface of the display panel 100. This width w may be, for example, about 1.6 mm.

As set forth hereinabove, in a curved display device according to one or more exemplary embodiments, a size of a bezel visually recognized by a user may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A curved display device comprising:
   a support frame having a curved shape; and
   a display panel disposed on the support frame and having a curved shape,
   wherein the support frame is curved into a shape of an arc of a sector, and a first side surface of the support frame is parallel to a first radius of the sector.

2. The curved display device of claim 1, wherein a second side surface of the support frame that faces the first side surface is parallel to a second radius of the sector.

3. The curved display device of claim 2, wherein an angle between an extension line of the first side surface and an extension line of the second side surface is substantially equal to an angle of the sector.

4. The curved display device of claim 1, wherein an angle between the first side surface and a display surface of the display panel is an obtuse angle.

5. The curved display device of claim 4, wherein an angle between the first side surface and the display surface of the display panel is in a range from about 121.85 degrees to about 127.85 degrees.

6. The curved display device of claim 1, wherein a distance between the first side surface and a side surface of the display panel adjacent to the first side surface is about 1.6 mm.

7. The curved display device of claim 2, wherein an angle between the second side surface and a display surface of the display panel is an obtuse angle.

8. The curved display device of claim 7, wherein an angle between the second side surface and the display surface of the display panel is in a range from about 121.85 degrees to about 127.85 degrees.

9. The curved display device of claim 2, wherein a distance between the second side surface and a side surface of the display panel adjacent to the second side surface is about 1.6 mm.

10. The curved display device of claim 1, further comprising:
    a light guide plate disposed below the display panel; and
    a light source disposed on at least one side of the light guide plate.

* * * * *